Feb. 20, 1940.   J. O'D. SHEPHERD   2,191,298
METERING SYSTEM
Original Filed July 23, 1932   3 Sheets-Sheet 3

Patented Feb. 20, 1940

2,191,298

UNITED STATES PATENT OFFICE 2,191,298

METERING SYSTEM

Judson O'Donald Shepherd, Atlanta, Ga.

Original application July 23, 1932, Serial No. 624,257. Divided and this application April 5, 1937, Serial No. 134,950

4 Claims. (Cl. 235—133)

This invention relates to measuring systems, and more particularly, to systems for measuring the time duration or the elapsed time of toll connections of a telephone system and for automatically printing said elapsed time.

Heretofore, what is generally known as calculagraphs were used for timing such connections. The calculagraph was primarily a master clock operated independently of the telephone circuits. At the beginning of a call the toll operator would insert a ticket in the clock and operate a lever. There would be printed on the ticket the dial of a clock with arrows indicating the time of day, a minute dial with an arrow indicating the minute and a five-minute dial with an arrow indicating the five-minute interval. At the termination of the call the operator would again insert the ticket in the clock and operate a lever. There would be printed on the dials other arrows from which the elapsed time and the charge could be computed.

The present invention provides an electrical timing system associated with the toll switchboard. This system includes a motor or clock driven elapsed time meter for each cord circuit, control circuits for controlling the starting, stopping and restoring to normal of said meters, an electrically controlled printing mechanism for each switchboard position or for every two positions for printing the elapsed time measured by any of said meters, signaling apparatus for indicating the condition of said meters and printing mechanism, and an operator's key for each cord circuit for starting and stopping the corresponding meter and for transmitting the reading of the meter (the elapsed time) to the printing mechanism which automatically prints the elapsed time on a ticket inserted therein. As disclosed, the starting of the elapsed time meters, the printing of the elapsed time measured by the meters and the restoring to normal of the meters are under the control of the operator, and the stopping of the meters is controlled by the operator or by the disconnect signal received by the operator at the termination of a call.

The present application is a division of my copending application Serial No. 624,257, filed on July 23, 1932, Patent No. 2,079,721, May 11, 1937.

Figure 1:
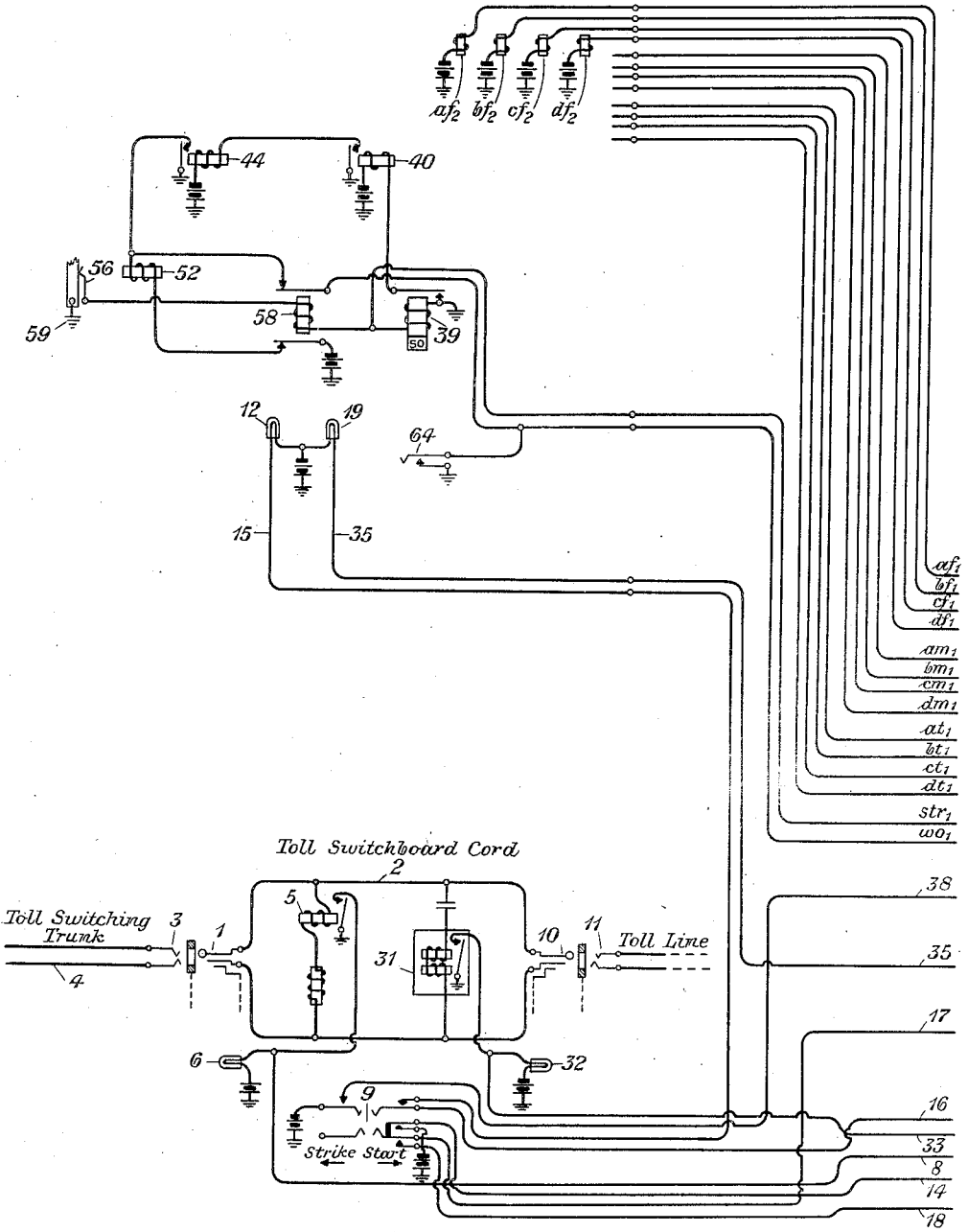
Figure 2:
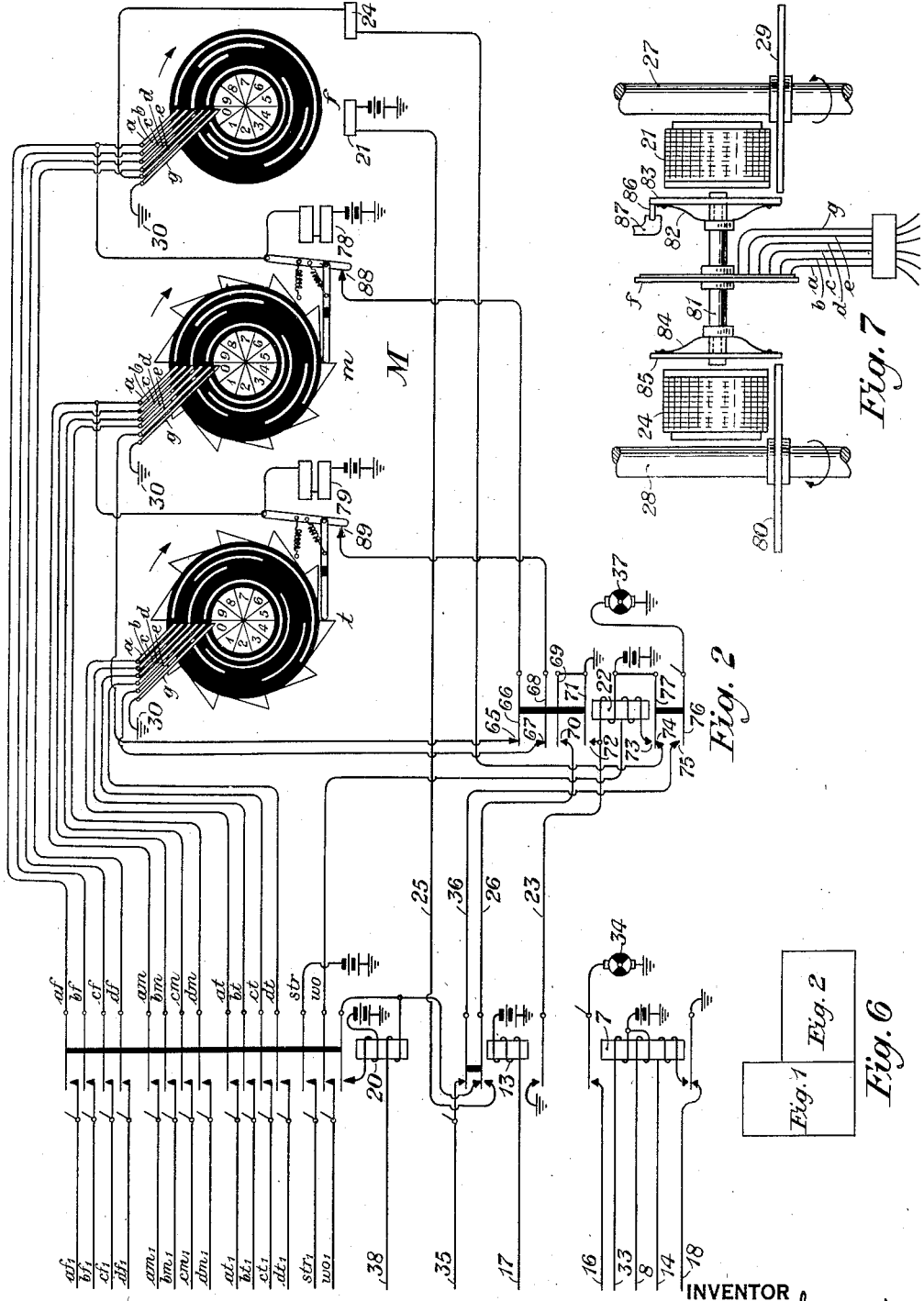
Figure 3:
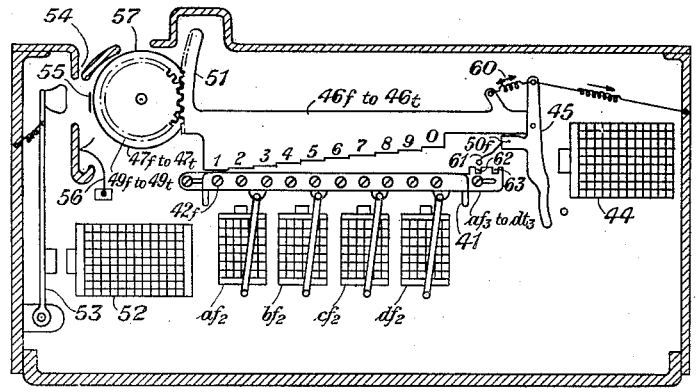
Figure 4:
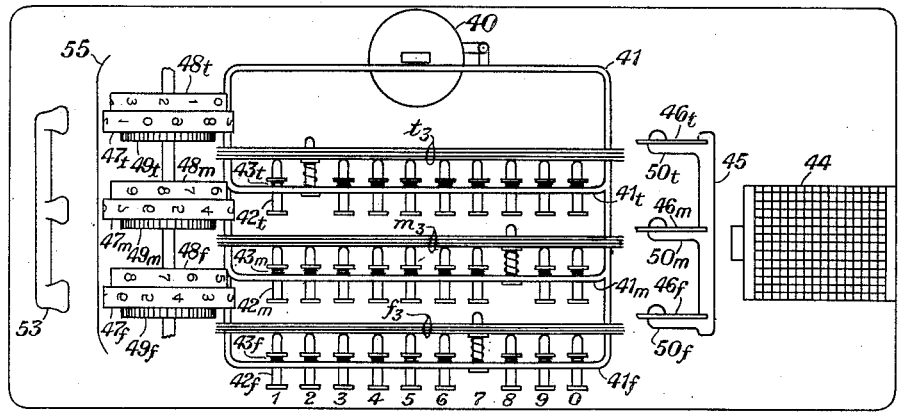
Figure 5:
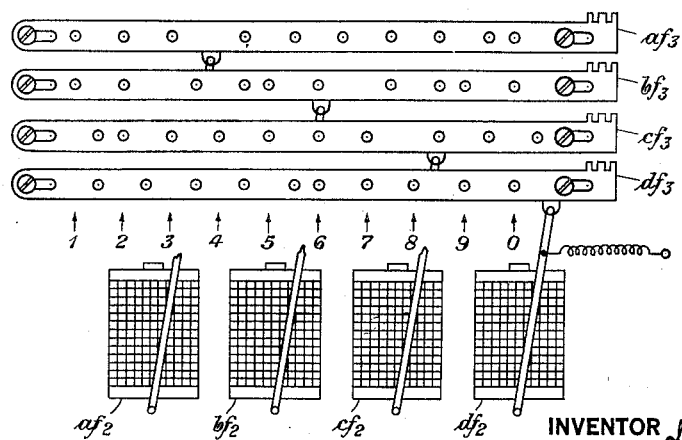

Figures 1 and 2 of the drawings when placed together in the manner indicated in Fig. 6, show schematically the electrical circuits of the system; Fig. 3 is a diagrammatic illustration of one side of the printing mechanism; Fig. 4 is a diagrammatic illustration of the top of the printing mechanism with the cover removed; Fig. 5 is a diagrammatic illustration of the selector bars and selector magnets of the printing mechanism; and Fig. 7 is a diagrammatic illustration of the driving means, and the start, stop and reset means associated with the fraction-minute wheel of one of the time meters.

The invention and the objects and features thereof, may be best understood by reference to the following detailed description of the operation of the system. Any necessary description of the apparatus will be set forth from time to time in connection with the description of the operation of the system.

When the toll switchboard operator ascertains from the calling party the details of the desired connection, she inserts answering plug 1 of a toll switchboard cord circuit 2 in jack 3 of a toll switching trunk 4. If the desired connection is of the type in which the calling party remains at his instrument and keeps his receiver off the hook, no current is impressed on the toll switching trunk and supervisory relay 5 remains unoperated. If the desired connection is of the "call-back" type, current is impressed on the toll switching trunk when the receiver of the calling party is replaced on its hook, and relay 5 operates and causes supervisory lamp 6 to be lighted. The operation of relay 5 also closes the circuit of the middle winding of stop relay 7 and causes the operation thereof. This circuit may be traced from the grounded battery at relay 7, through the middle winding of said relay and lead 8 to the contact and grounded armature of relay 5. The operation of relay 7 at this time has no effect on the system because the operator's control key 9 is in its normal position. The operator now inserts plug 10 in jack 11 of the toll line leading to a distant central office with which the local circuit of the called party is associated, signals said distant central office and communicates the necessary information concerning the call to the distant central office operator, who in turn completes the connection to the called party.

When the called party answers, the operator at the central office associated with the line of the calling party notifies said calling party that the connection is ready. Of course, if the connection is of the "call-back" type, said operator rings the calling party and upon his response notifies him that the connection is ready. The answer of the calling party, in response to the ringing signal, removes battery from trunk 4 and causes the release of relay 5. Lamp 6 is extinguished, and relay 7 is released. The operator then operates key 9 to the right to its start position. The operation of key 9 to this position prepares a locking circuit for relay 7, prepares a flashing circuit for lamp 12 which is associated with the printing mechanism, and closes the circuit of start relay 13. Said locking circuit for relay 7 may be traced from the grounded battery at key 9, through the middle right contact and spring of key 9, lead 14, lower winding of relay 7, to the lower front contact of relay 7. Said flashing circuit for lamp 12 may be traced from grounded battery at said lamp, through lead 15, the upper right contact and spring of key 9 and lead 16 to the upper front contact of relay 7. The circuit of start relay 13 may be traced from grounded battery at said relay, through the winding of said relay, lead 17, the lower right spring and contact of key 9, lead 18, and the lower back contact of relay 7 to the grounded lower armature of relay 7. The closure of the latter circuit causes the operation of start relay 13. In operating, relay 13 opens at a second point, i. e., its upper back contact, the normally open flashing circuit of lamp 19. At its lower back contact said relay opens at a second point the normally open operating and locking circuits of cut-through relay 20. At its upper front contact said relay prepares an operating circuit for start magnet 21. At its lower front contact said relay closes the operating circuit of wipe-out relay 22. The circuit of the wipeout relay may be traced from the grounded battery at said relay, through its upper winding, lead 23, and the lower armature of relay 13 to the grounded lower front contact of relay 13. Relay 22 in operating, closes a locking circuit for itself through its upper winding, contact 72, armature 71, and the ground associated with said armature. At contact 73 said relay prepares a release circuit for itself which may be traced from the grounded battery at said relay, through armature 77, contact 73, its lower winding, which is a differential winding, lead wo to the armature of relay 20. At contacts 74, 65 and 67 said relay opens at a second point the respective circuits of release magnet 24 and stepping magnets 78 and 79. The functions and circuits of these magnets will be explained below. At contact 75 relay 22 prepares a flashing circuit for lamp 19. At contact 70 said relay closes the operating circuit of rotary magnet 21, the circuit of which was previously prepared by the operation of relay 13. The operating circuit of magnet 21 may be traced from the grounded battery of said magnet, through the winding of said magnet, lead 25, the upper front contact of relay 13, the upper middle armature of relay 13, lead 26, contact 70 of relay 22, to grounded armature 69 of relay 22. The operation of magnet 21 sets the elapsed time meter M into operation.

The elapsed time meter M, its driving means and the circuits associated therewith, are shown schematically in Figs. 2 and 7. As shown, the meter consists of a driving shaft 27, a restoring shaft 28, a fraction-minute dial wheel $f$, a minute dial wheel $m$, a ten-minute dial wheel $t$, stepping magnets 78 and 79, and a plurality of brushes. Fraction-minute wheel $f$ is adapted to be rotated during the timing of the call by driving shaft 27. Driving shaft 27 is rotated continuously at a constant speed by a constant speed synchronous motor, for example. Minute wheel $m$ is adapted to be rotated periodically through a predetermined arc, for example $\frac{1}{10}$ of a revolution, by stepping magnet 78 which is operated and released once during each revolution of the fraction-minute wheel. Ten-minute wheel $t$ is adapted to be rotated periodically through a predetermined arc, for example $\frac{1}{10}$ of a revolution, by stepping magnet 79 which is operated and released once during each revolution of the minute wheel. The fraction-minute wheel is restored to its normal zero position by restoring shaft 28, which is adapted to be rotated continuously at a greater speed than shaft 27. During their restoration the fraction-minute wheel, the minute wheel and the ten-minute wheel rotate in the same direction as they do during the timing of the call. When the fraction-minute wheel, during the restoring operation, reaches its normal zero position, stepping magnet 78 becomes operative to restore the minute wheel from any off-normal position to its normal zero position, and when it reaches its normal zero position, stepping magnet 79 becomes operative to restore the ten-minute wheel from any off-normal position to its normal zero position. Driving shaft 27 and restoring shaft 28 may be rotated by different motors or by the same motor through suitable gearing apparatus. A driving disc 29 is mounted on driving shaft 27 and a restoring disc 80 is mounted on restoring shaft 28. Fraction-minute wheel $f$ is mounted on a shaft 81, the axis of which is at right angles to the axes of shafts 27 and 28. On one end of shaft 81 is mounted by means of spring 82 a disc 83, and on the other end is mounted by means of spring 84 a disc 85. As shown in Fig. 7, the rotary magnet 21 is positioned between the face of disc 83 and shaft 27, release magnet 24 is positioned between the face of disc 85 and shaft 28, and the faces of discs 83 and 85 are positioned adjacent the periphery of discs 29 and 80, respectively. When rotary magnet 21 is operated, disc 83 is adapted to be moved into engagement with disc 29 and be rotated thereby at a constant predetermined speed. When release magnet 24 is operated, disc 85 is adapted to be moved into engagement with disc 80 and be rotated thereby at a greater speed. As shown in Fig. 2, each of the wheels is divided into ten sections numbered from zero to 9. A group of five brushes $a$ to $e$, inclusive, is provided to press against each wheel at points in a straight line with respect to the radius of each wheel. On each section of each wheel is embedded insulating material to form a different pattern according to a predetermined code. The pattern of the corresponding section of each of the wheels is the same. The uninsulated parts of each section of each wheel form a conducting path from brushes $a$ to $e$, inclusive, to brush $g$ which is grounded at 36. It can be seen therefore, that as the wheels rotate, certain brushes associated with each wheel will come in contact with the uninsulated portions of the sections and will be connected to ground according to a predetermined code. For example, when the wheels are in their normal or zero position brush $c$ of each wheel is connected to ground. Now suppose the connection described above should last 28.7 minutes. Fraction-minute wheel $f$ would be in such a position that the brushes would be in contact with section numbered 7 and brushes $a$ and $b$ would be connected to ground. Minute wheel $m$ would be in such a position that the brushes associated therewith would be in contact with section numbered 8 and brushes $a$, $b$ and $c$ would be connected to ground. Ten-minute wheel $t$ would be in such a position that the brushes associated therewith would be in contact with section numbered 2 and brush $d$ would be connected to ground. It will be noted from an inspection of the drawing that that part of each wheel which is under brush $e$ is not insulated in any of the sections except that numbered zero of which only one spot is insulated and that the brushes $e$ will always be connected to ground except at the moment when the wheels are in their normal positions. This insures the operation of release magnet 24, stepping magnet 78 or stepping magnet 79, as the case may be, when wipe-out relay 22 is released, no matter in what position, other than normal, any of the wheels are. The provision of an electrical carry-over arrangement in contradistinction to an ordinary mechanical carry-over arrangement is preferable in that it tends to insure more accurate registration. However, it is to be understood that the invention in its broader aspects is not limited to an electrical carry-over arrangement nor to the particular carry-over arrangement disclosed.

Returning now to the operation of the system, it will be recalled that when the connection was ready, the operator operated key 9 to its start position. This caused the operation of relay 13 which in turn caused the operation of relay 22. The operation of relays 13 and 22 caused the operation of rotary magnet 21. The operation of magnet 21 attracts disc 83 and causes it to move into engagement with rotating disc 29 and be rotated thereby at a constant predetermined speed. The rotation of disc 83 causes the rotation of fraction-minute wheel $f$ at a constant predetermined speed. When the fraction-minute wheel has rotated 24 seconds or through $\frac{4}{10}$ of a revolution it is in such position that its brushes are in contact with the section numbered 4 and brush $a$ is connected to ground. This completes the circuit for and causes the operation of stepping magnet 78. This circuit may be traced from grounded battery through the winding of said magnet, brush $a$ and brush $g$, to ground 30. The operation of magnet 78 causes the pawl associated with its armature to engage the next tooth of minute wheel $m$. Magnet 78 remains operated as the fraction-minute wheel rotates for the next 36 seconds or through the next $\frac{6}{10}$ of its revolution. As the fraction-minute wheel rotates from a position such that its brushes are in contact with the section numbered 9 to a position such that its brushes are again in contact with the section numbered 0, the connection between brush $a$ and grounded brush $g$ is broken and magnet 78 releases. The release of magnet 78 steps minute wheel $m$ $\frac{1}{10}$ of a revolution. When the fraction-minute wheel has rotated 4 revolutions minute wheel $m$ is in such position that its brushes are in contact with the section numbered 4, and a circuit is completed for the operation of stepping magnet 79. This circuit may be traced from grounded battery through the winding of said magnet and brushes $a$ and $g$ of minute wheel $m$ to ground 30. The operation of magnet 79 causes the pawl associated with its armature to engage the next tooth of ten-minute wheel $t$. Magnet 79 remains operated until minute wheel $m$ rotates from a position such that its brushes are in contact with the section numbered 9 to a position such that the brushes are again in contact with the section numbered 0, at which time the connection between brush $a$ and grounded brush $g$ of minute wheel $m$ is broken and magnet 79 is released. The release of magnet 79 steps ten-minute wheel $t$ $\frac{1}{10}$ of a revolution. The measuring wheels of the meter $m$ continue to rotate as described above, as long as the connection remains established.

The method of carryover precludes errors in readings taken at or near the instant of this occurrence. As will be described below, the transmission of the digit 9 is effected by brushes $a$ and $c$ of wheel $f$, for example, having ground extended to them from grounded brush $g$ and the segments of the wheel, and digit 0 by a circuit through brush $c$ alone. As wheel $f$ moves from position 9 to position 0, it effects the advance of wheel $m$ by one position, say from 0 to 1, by the opening of the circuit through brush $a$. It will be seen, therefore, that carryover is effected by the same means which causes the code of the lower wheel to be changed from 9 to 0, which prevents wheel $m$, for example, advancing to the position for transmitting digit 1 before wheel $f$ reaches the position for transmitting 0, or wheel $f$ reaching the position for transmission 0 before wheel $m$ reaches the position for the digit 1. The very change in code from 9 to 0, itself, effects the carryover which prevents an improper reading taken at or near the position in which carryover occurs, whereas mechanical carryovers may result in such readings being improper due to the next higher wheel changing the circuit combination through its brushes slightly ahead or behind the change effected by the lower wheel through its brushes.

At the termination of the call the restoration of the receiver to the hook by the calling party causes the operation of relay 5, or, the signaling of the local operator by the distant operator causes the operation of relay 31, whichever occurs first. As described above, the operation of relay 5 causes lamp 6 to be lighted and causes the operation of stop relay 7 through its middle winding. Relay 31 may be an alternating current relay or a chain of relays adapted to be operated by alternating current. If the signal from the distant operator should be received before the calling party restores his receiver to its hook, relay 31 will be operated which will cause supervisory lamp 32 to be lighted and cause stop relay 7 to be operated through its upper winding. The latter circuit may be traced from the grounded battery at relay 7, through its upper winding, lead 33, to the contact and grounded armature of relay 31. The operation of stop relay 7 opens at its lower back contact the circuit of start relay 13, which was traced above. At its lower front contact relay 7 closes a locking circuit for itself through the circuit which was prepared by the operation of key 9 to its start position and which was described above. At its upper front contact relay 7 closes the flashing circuit of lamp 12. The flashing of this lamp is caused by the operation of interrupter 34 which intermittently removes ground from the circuit. The release of relay 13 opens at its upper front contact the circuit of rotary magnet 21, the release of which permits disc 83 to return under the influence of spring 82 to its normal disengaged position with respect to disc 29. This, of course, stops the operation of the meter. At its lower front contact relay 13 opens the operating winding of relay 22, but said relay remains operated through its locking circuit. At its lower back contact relay 13 prepares an operating and locking circuit for cut-through relay 20. At its upper back contact relay 13 closes the flashing circuit of lamp 19. The latter circuit may be traced from grounded battery at lamp 19, through said lamp, lead 35, the upper back contact of relay 13, the uppermost armature of said relay, lead 36, contact 75 of relay 22, armature 76 of said relay, to interrupter 37 and ground. It will be noted that the circuit of lamp 12 is under the control of key 9 and stop relay 7, whereas the circuit of lamp 19 is under the control of start relay 13 and wipe-out relay 22. As a result lamp 12 starts flashing as soon as stop relay 7 is operated due to the restoration of the receiver at the calling subscriber's station or to the reception of the disconnect signal from the distant central office. This indicates that the call has been terminated. A moment later lamp 19 starts flashing due to the release of start relay 13 and of rotary magnet 21. This indicates that the timing apparatus has ceased to rotate, that the talking connections may be taken down, that the operator's key 9 may be restored to normal or operated to strike position, and that the elapsed time now registered by the meter may be transmitted to the printing apparatus which is adapted to print said elapsed time on a ticket inserted therein.

The operator now takes down the connection by removing plugs 1 and 10 from jacks 3 and 11, respectively, which causes supervisory lamps 6 and/or 32 to be extinguished and the circuits of the upper and middle windings of stop relay 7 to be opened. Then the operator restores key 9 to its normal position. The restoration of key 9 to its normal position opens at its upper right contact and spring the flashing circuit of lamp 12, opens at the middle contact and spring the pocking circuit of stop relay 7, and opens at a second point the operating circuit of start relay 13. Lamp 19 continues to flash, which indicates that there is an elapsed time reading on one of the meters awaiting transmission to the printing apparatus. The release of stop relay 7 opens at a second point its locking circuit and the flashing circuit of lamp 12 and also prepares a circuit for the reoperation of start relay 13 when the cord circuit is used for establishing another talking connection. It is apparent from the drawings that, as described above, the cord circuit may be taken down before the restoration of key 9 to its normal position, or that it may remain up until after the key has been restored to normal, or even until after the key has been operated to the strike position and the reading printed on a ticket inserted in the printing apparatus.

The operator next inserts the ticket in slot 54 of the printing mechanism (Fig. 3) and operates key 9 (Fig. 1) to its strike position which causes the operation of cut-through relay 20. This circuit may be traced from grounded battery at the left of key 9, through the left upper spring and contact of key 9, lead 38, lower winding of relay 20, lower back contact of relay 13, middle armature of relay 13, lead 26, contact 70 of relay 22, armature 69 of relay 22, to ground. Upon operating, relay 20 immediately closes a locking circuit for itself which may be traced from grounded battery at said relay, through the upper winding of said relay, the lowermost front contact and the lowermost armature of said relay, the lower front contact of relay 13, and through lead 26 to ground at relay 22. Cut-through relay 20 is of the gang type and is adapted to connect through its contacts and armatures leads $af$ to $dt$, inclusive, with leads $af_1$ to $dt_1$, respectively, and also to connect control leads $str$ and $wo$ with leads $str_1$ and $wo_1$, respectively. In other words, the operation of relay 20 connects ground to certain of the conductors $af_1$ to $dt_1$, inclusive, depending upon the positions of wheels $f$, $m$ and $t$, which determine which of brushes $a$ to $d$ are connected to ground 30. In the illustration given above the elapsed time registered by meter M was supposed to be 28.7 minutes. In this case leads $af_1$, $bf_1$, $am_1$, $bm_1$, $cm_1$ and $dt_1$ would be connected to ground.

The essential features of the printing mechanism are shown schematically in Figs. 3, 4 and 5, and the electrical circuits therefor are shown schematically in the upper part of Fig. 1. The printing mechanism includes three groups of four selector magnets, three groups of four selector bars and three groups of ten spring pins. One group of selector magnets, selector bars and spring pins is provided for each dial wheel of the elapsed time meter—namely, the fraction-minute wheel, the minute wheel, and the ten-minute wheel. The four selector magnets and the four selector bars of each group correspond to brushes $a$ to $d$, respectively, which are associated with each of the dial wheels. The ten spring pins of each group correspond to numerals zero to 9. Each selector bar is connected to the armature of a selector magnet and is adapted to be shifted to the left, for example, when the corresponding selector magnet is energized. The arrangement of the selector bars and magnets is shown schematically in Figs. 3 and 5, only those corresponding to the fraction-minute wheel being shown. The selector magnets are designated by reference characters $af_2$ to $df_2$, inclusive, and the selector bars are designated by reference characters $af_3$ to $df_3$, inclusive. As shown in Fig. 5, each selector bar has a plurality of holes therein, the relative position of each hole being in accordance with a predetermined code which corresponds to the code in the meter. Each group of spring pins $42_f$, $42_m$ and $42_t$ (Fig. 4) is carried by and inserted through a light frame $41_f$, $41_m$ and $41_t$. Each frame forms a part of armature 41 of positioning magnet 40. Associated with each pin and located between the frame and a stop member on each pin is a spring $43_f$, $43_m$ and $43_t$, the function of which will be explained later. The printing mechanism also includes a register magnet 44 having a pivoted armature 45, three register bars $46_f$, $46_m$ and $46_t$, and three type wheels comprising the printing wheels $47_f$, $47_m$ and $47_t$, visual wheels $48_f$, $48_m$ and $48_t$, and pinion wheels $49_f$, $49_m$ and $49_t$. The arrangement of the register magnet, the register bars and the type wheels, is shown schematically in Figs. 3 and 4. Each register bar, one for each digit, is pivoted at one end and is supported thereat, when the register magnet is unoperated, by supporting bars $50_f$, $50_m$ and $50_t$, which form parts of armature 45. The other end of each register bar terminates in a rack 51 which engages pinion wheels $49_f$, $49_m$ and $49_t$, respectively. Each register bar has a series of stops on its under side, these stops being carefully designed as to relative height in view of the turning radius of the bars and pinion wheel. There is a stop corresponding to each of the ten spring pins. For a given number to be printed the selector magnets and the positioning magnet operate to cause the proper pin to be projected through the selector bars. When the register magnet operates and causes the register bars to be forced down, said bars encounter the projecting pins and are stopped. The movement of the register bars positions, by means of the racks and pinion wheels, the type wheels for the numerals to be printed. After the type wheels have been positioned a strike magnet 52 is energized causing the hammers associated with its armature 53 to strike a ticket which has been inserted in the slot indicated at 54 in Fig. 3. The impact forces the ticket against an inked ribbon 55 and the numerals on the printing wheels positioned in front of it, and causes the numerals to be printed on said ticket. The insertion of the ticket in the slot breaks a circuit between spring 56 and the grounded back of the slot. The function of this feature will be described later. The numerals on the printing wheels and on the visual wheels are so positioned with respect to one another that for each given type number positioned in front of the hammers, the corresponding numeral on the visual wheel is disclosed to the operator through a window in the top of the printing mechanism, said window being indicated at 57 in Fig. 3.

The electrical and mechanical operation of the printing mechanism will now be described with reference to the illustration given above in which 28.7 minutes was assumed to be the reading recorded on the elapsed time meter M. It will be recalled that the operator had operated key 9 to the strike position which in turn had caused the operation of cut-through relay 20, and that the operation of relay 20 had connected ground 30 to leads $af_1$, $bf_1$, $am_1$, $bm_1$, $cm_1$ and $dt_1$ and had connected grounded battery to leads $str_1$ and $wo_1$. The connection of ground to lead $af_1$ completes the operating circuit of selector magnet $af_2$. The operation of selector magnet $af_2$ by means of its armature slides selector bar $af_3$ to the left. Likewise, selector magnet $bf_2$ will be operated over grounded lead $bf_1$ and will slide selector bar $bf_3$ to the left. An inspection of Fig. 5 will indicate that with these bars in their operated positions and the other bars in their normal positions, the holes in all the selector bars will be in alignment opposite the arrow numbered 7 which corresponds to the position of spring pin numbered 7, and that no other holes will be in alignment opposite any of the arrows. The connection of ground to leads $am_1$, $bm_1$ and $cm_1$ operates selector magnets $am_2$, $bm_2$ and $cm_2$. The $m_2$ magnets and the $t_2$ magnets are not shown in the drawings. However, it is understood that these magnets are located behind the $f_2$ magnets and occupy the same relative positions as said $f_2$ magnets. The same is true of the $m_3$ and $t_3$ selector bars. Consequently, an inspection of Fig. 5 will indicate that when selector bars $am_3$, $bm_3$ and $cm_3$ have been shifted to the left, the other remaining in its normal position, the holes of all the $m_3$ selector bars will be in alignment opposite the arrow or spring pin numbered 8 and that no other holes will be in alignment opposite any of the other arrows or spring pins. The connection of ground to lead $dt_1$ operates selector magnet $dt_2$, the operation of which in turn causes selector bar $dt_3$ to be shifted to the left. An inspection of Fig. 5 will indicate that when bar $dt_3$ has been shifted to the left, the others remaining in their normal positions, the holes in all the $t_3$ selector bars will be in alignment opposite the arrow or pin numbered 2 and that no other holes will be in alignment opposite any of the other arrows or pins. The connection of grounded battery to lead $str_1$ energizes relay 39 (Fig. 1). The circuit of relay 39 may be traced from grounded battery connected to lead $str$ (Fig. 2), through lead $str$, the armature and contact of relay 20, lead $str_1$ and the winding of relay 39 to ground at said relay. The winding of relay 58 is connected in parallel with the winding of relay 39. However, relay 58 does not operate due to the fact that the operator inserted a ticket in slot 54 before operating key 9 to its strike position, said insertion breaking the connection between spring 56 (Figs. 1 and 3) and the back of the slot which is grounded at 59 (Fig. 1). Relay 39 is of the slow operating type and does not operate until after the selector magnets have been operated and the selector bars shifted to their left operated position. After the selector bars have been shifted to the left, relay 39 operates and closes the operating circuit of positioning magnet 40 (Figs. 1 and 4). This circuit may be traced from ground at relay 39 (Fig. 1), through the contact and armature of relay 39 and the winding of positioning magnet 40 to grounded battery.

Magnet 40 in operating attracts its armature 41 (Fig. 4) to the position shown. The movement of armature 41 to the position shown causes frames $41_f$, $41_m$ and $41_t$ to press against all of the springs $43_f$, $43_m$ and $43_t$, and all of the pins $42_f$, $42_m$ and $42_t$ of each group try to pass through the holes of the selector bars. However, it will be remembered that in the example given only the holes opposite the $f$ spring pin numbered 7, the holes opposite the $m$ spring pin numbered 8 and the holes opposite the $t$ spring pin numbered 2 are in alignment. As a result only these three pins will be able to pass through the selector bars. The springs $43_f$, $43_m$ and $43_t$ associated with the other pins are compressed by the movement of the frames and thus cause said other pins to press against said selector bars and at the same time permit the movement of the frames. The springs associated with the pins that pass through the bars are not compressed by the movement of the frames, but said springs transmit to the pins the force exerted by the movement of the frames in order to cause said pins to pass through the aligned holes in the selector bars. Fig. 4 shows the position of the pins in the example given, after the operation of the positioning magnet. Magnet 40 in addition to positioning the pins also closes the operating circuit of register magnet 44 (Figs. 1, 3 and 4). This circuit may be traced from the grounded armature of magnet 40 (Fig. 1), through the contact of said magnet and the winding of register magnet 44 to grounded battery.

Magnet 44 in operating, attracts its armature 45. The movement of armature 45 lowers the supporting members $50_f$, $50_m$ and $50_t$ and by means of springs 60 forces down register bars $46_f$, $46_m$ and $46_t$ until they strike the pins protruding through the selector bars. The lowering of supporting bars $50_f$, $50_m$ and $50_t$ also moves springs 61 into slots 62 or 63, depending upon whether the corresponding selector bar has been shifted to the left or not. The movement of these springs into the slots locks the selector bars and prevents their derangement during the printing operation. As the register bars move downward until they strike the protruding pins, racks 51 rotate pinion wheels $49_f$, $49_m$ and $49_t$ through an arc determined by the arc through which the corresponding register bar moves. In the example given the printing wheels $47_f$, $47_m$ and $47_t$ would be rotated to positions in which the numeral 7 of the $f$ wheel, the numeral 8 of the $m$ wheel, and the numeral 2 of the $t$ wheel would be opposite the respective hammers. With the printing wheels in this position the reading 28.7 on the visual wheels would also be visible through the aperture 57 as described above. In addition to positioning the type wheels the operation of register magnet 44 also closes the operating circuit of strike magnet 52 (Figs. 1 and 3). This circuit may be traced from the grounded armature and contact of magnet 44 (Fig. 1), through the winding of magnet 52 and the lower back contact and armature of relay 58, to grounded battery. Magnet 52 operates and causes the hammers associated with its armature 53 to strike the ticket and force it against ribbon 55 and the numerals on the printing wheel. This causes the reading to be printed on the ticket, said reading being 23.7 in the example given. This completes the printing operation.

In addition to causing the operation of strike magnet 52, the operation of register magnet 44 closes the circuit of the lower winding of wipe-out relay 22. This circuit may be traced from the grounded armature and contact of magnet 44 (Figs. 1 and 2), the upper back contact and armature of relay 58, lead $wo_1$, the contact and armature of relay 20, lead $wo$, the lower winding of relay 22, contact 73 and armature 77 of relay 22, to grounded battery at said relay. Relay 22, being differentially wound, releases. The release of relay 22 opens at contact 72 its own locking circuit, opens at contact 70 the operating and the locking circuit of relay 20, opens at contact 75 the flashing circuit of lamp 19, closes at contact 74 the operating circuit of release magnet 24 in case the fraction-minute wheel $a$ of the elapsed time meter is in an off-normal position, closes at contact 65 the operating circuit of stepping magnet 78 in case the minute wheel $m$ is in an off-normal position, and closes at contact 67 the operating circuit of stepping magnet 79 in case the ten-minute wheel $t$ is in an off-normal position. The release of relay 20 removes grounded battery from lead $str_1$ which causes the release of relay 39. The release of relay 39 causes the release of the magnets of the printing mechanism which restores all said printing mechanism to normal except the selector bars. The release of relay 20 also removes ground from leads $af_1$ to $dt_1$, inclusive, which releases any of selector magnets $af_2$ to $dt_2$, inclusive, which may be operated. The release of the latter magnets restores the selector bars to normal. The operation of release magnet 24 and/or stepping magnet 78 and/or stepping magnet 79 restores the wheels of the elapsed time meter to their normal zero position. The extinguishment of lamp 19 indicates to the operator that the printing mechanism has been restored to normal and that said apparatus may be used again for another connection. After the extinguishment of lamp 19 the operator then, of course, operates key 9 from its strike position to its normal position.

The restoring operation of the meter will be described with reference to the example given above. It will be recalled that under said example the section numbered 7 of the fraction-minute wheel, the section numbered 8 of the minute wheel, and the section numbered 2 of the ten-minute wheel were under the respective groups of brushes when key 9 was operated to stop the timing of the call. With the fraction-minute wheel in this position brushes $a$ and $e$ thereof will be connected to ground 30 through brush $g$ thereof and, as a result, the circuit of release magnet 24 will be prepared, the circuit of stepping magnet 78 will be closed, and stepping magnet 78 will be operated. With the minute wheel in this position brushes $a$ and $e$ thereof will be connected to ground 30 through brush $g$ thereof and, as a result, the circuit of stepping magnet 79 will be closed, magnet 79 will be operated, and the stepping circuit of magnet 78 will be prepared. With the ten-minute wheel in this position brush $e$ thereof will be connected to ground through brush $g$ thereof and the stepping circuit of magnet 79 will be prepared. Now, when relay 22 is released as described above, its release will have no immediate effect on stepping magnets 78 and 79 and as a result the minute wheel $m$ and the ten-minute wheel $t$ will remain stationary for the time being, but the release of relay 22 will cause the immediate operation of magnet 24. The operation of magnet 24 attracts disc 85 and causes it to move into engagement with disc 80 and be rotated thereby at a comparatively high speed. This causes the fraction-minute wheel to be rotated until its section numbered 9 passes out from under the brushes associated with said wheel, at which time ground is removed from release magnet 24 and stepping magnet 78. The release of magnet 24 permits disc 85 to return under the influence of spring 84 to its normal disengaged position with respect to disc 80 and the rotation of fraction-minute wheel $f$ ceases, it now being in its normal zero position. The release of stepping magnet 78 steps minute wheel $m$ $\frac{1}{10}$ of a revolution by means of the pawl associated with its armature. When the armature of magnet 78 reaches its full released position, it closes at contact 88 a stepping circuit for said magnet. This circuit may be traced from grounded battery through the winding of said magnet, the armature of said magnet, contact 88, armature 66 and contact 65 of relay 22 and brushes $e$ and $g$ of the minute wheel, which is in an off-normal position, to ground 30. Magnet 78 operates and releases repeatedly, and, as a result, steps minute wheel $m$ around until section numbered 9 thereof passes out from under the brushes associated with said wheel, at which time ground is removed from brushes $a$ and $e$ thereof. The removal of ground from brush $e$ prevents the further operation of stepping magnet 78 and hence, minute wheel $m$ stops rotating and remains in its normal zero position. The removal of ground from brush $a$ releases stepping magnet 79. The release of this magnet steps ten-minute wheel $t$ $\frac{1}{10}$ of a revolution. The full release of the armature of magnet 79 closes a stepping circuit for said magnet. This circuit may be traced from grounded battery through the winding of said magnet, the armature of said magnet, contact 89, armature 68 and contact 67 of relay 22, and brushes $e$ and $g$ of ten-minute wheel $t$ to ground 30. Magnet 79 operates and then releases repeatedly, and, as a result, steps ten-minute wheel $t$ around until section numbered 9 thereof passes out from under the brushes associated with said wheel, at which time ground is removed from brush $e$. The removal of ground from brush $e$ prevents the further operation of stepping magnet 79 and hence, ten-minute wheel $t$ stops rotating and remains in its normal zero position. All three wheels have now been restored to their normal zero positions. Of course, it is understood that the stepping magnets operate very rapidly and that the entire restoring operation of the three wheels takes place in a very short time.

The restoring operation of the wheels from any off-normal position is identical with that described above, except where either or both of wheels $f$ and $m$ are in such position, when relay 22 is released, that the brushes thereof are in contact with any of the sections numbered 0 to 3, inclusive. If wheel $f$ is in such a position, stepping magnet 78 will begin to operate as soon as relay 22 releases and will rotate the minute wheel until the brushes of the fraction-minute wheel come in contact with section numbered 4, whereupon said stepping magnet will operate and remain operated until the fraction-minute wheel is restored to its normal zero position. If minute wheel $m$ is in such a position, stepping magnet 79 will begin to operate as soon as relay 22 releases and will continue to operate until the brushes of minute wheel $m$ come in contact with section numbered 4, whereupon said stepping magnet will operate and remain operated until the minute wheel is restored to its normal zero position. From this point on the restoring operation is the same as that described above.

By referring to Fig. 7, it will be seen that a stud 86 is fastened to disc 83. This stud is adapted to come in contact with stop pawl 87 when the fraction-minute wheel reaches its normal zero position during the restoring operation. It will be apparent from an inspection of Fig. 7 that stud 86 will not engage pawl 87 during the timing of the call because disc 83 is attracted and moved to the right by magnet 21 when it is operated, but that said stud will engage said pawl during the restoring operation because at this time magnet 21 is unoperated and disc 83 is in its normal position. This additional stepping means is provided to insure that the fraction-minute wheel stops in its normal zero position without any overthrow, which, if such means were not provided, might occur during the restoring operation due to the comparatively high speed at which the fraction-minute wheel is restored.

As shown, the system is so arranged that the operator at any time during the connection may take a reading of the elapsed time without printing said elapsed time, and without restoring the elapsed time meter to normal. To do this the operator merely operates key 9 to the strike position, notes the reading indicated on the visual wheel of the printing mechanism, and then restores key 9 to the starting position. As the key passes through its normal position in its movement from its start to its strike position, start relay 13 is released. The release of relay 13 releases rotary magnet 21 which stops the rotation of the meter, prepares an operating and locking circuit for cut-through relay 20, and closes the flashing circuit of lamp 19. The further movement of key 9 to its strike position causes the operation of cut-through relay 20. The operation of relay 20 in the same manner as before, closes a locking circuit for itself, prepares a circuit for the release of relay 22, causes the operation of certain selector magnets $af_2$ to $dt_2$ and causes the operation of relay 39, the latter in turn causing the operation of positioning magnet 40 and register magnet 44. As described above, the operation of these relays and magnets causes the type wheels of the printing mechanism to be rotated to such a position that certain numerals on the visual wheels corresponding to the elapsed time measured by the meter, are visible through the aperture indicated at 57, and the numerals on the printing wheels are positioned in front of the strike hammers. However, since no ticket is inserted in the slot indicated at 54, the circuit between spring 56 and the grounded back of the slot will remain closed. Hence, the operation of relay 20 causes the operation of ticket test relay 58. This circuit may be traced from the grounded back of the slot indicated at 59, through spring 56, the winding of relay 58, lead $str_1$, the contact and armature of relay 20, and lead $str$ to grounded battery. The operation of relay 58 prevents, after the operation of register magnet 44, the operation of strike magnet 52 by opening the circuit thereof at its lower contact and armature, and also prevents, after the operation of register magnet 44, the release of wipe-out relay 22 by opening, at a second point, the circuit of the lower winding of differential relay 22. Thus, the printing mechanism will indicate the elapsed time, but in this case will not automatically restore the elapsed time meter and its own mechanism to normal. After the reading has been noted, the operator restores key 9 to its start position. The restoration of said key to its start position reoperates start relay 13. The reoperation of start relay 13 reopens the flashing circuit of lamp 19, reoperates the rotary magnet 21 to restart the rotation of the meter and release relay 20. The release of relay 20 opens, at a third point, the circuit of the lower winding of differential relay 22, releases relay 58, releases relay 39, which in turn releases magnets 40 and 44, and releases magnets $af_2$ to $dt_2$. Thus, the reading of the elapsed time meter is made, the printing mechanism is restored to normal, and the meter resumes the timing of the call after only a momentary interruption.

Also, an auxiliary wipe-out key is provided to clear any meter after a false start. This key is indicated at 64 in Fig. 1. The operation of this key, after key 9 has been operated to its strike position, closes the circuit of the lower winding of wipe-out differential relay 22, and causes the release of said relay. This circuit may be traced from the grounded contact and spring of key 64, through lead $wo_1$, the contact and armature of relay 20, lead $wo$, the lower winding of relay 22, contact 73 and armature 77 of relay 22, to grounded battery. The release of this relay opens its own locking circuit, opens the circuit of lamp 19, opens the operating and locking circuits of relay 20, and closes the circuit of release magnet 24 and/or the circuits of stepping magnets 78 and 79. The release of relay 20 and the operation of magnets 24, 78 and/or 79, restores all the apparatus to normal, as described above. The operator then, of course, releases key 64 and restores key 9 to the start position which starts anew the timing of the call.

This invention has been illustrated and described in connection with a system for timing telephone toll calls. However, it is to be understood that the apparatus and principles of operation disclosed are applicable to any type of measuring system in which it is desired to transmit electrically the reading of a meter or register to a printing and/or indicating mechanism, and to operate said mechanism electrically for the purpose of printing and/or indicating said reading. It is also to be understood that the meters per se or the respective sub-systems per se, in contradistinction to the disclosed system as a whole, may be used separately to accomplish the functions contemplated thereby without departing from the spirit and scope of the invention.

What is claimed is:

1. Measuring apparatus comprising a first counting unit, driving means therefor, circuit means for electrically transmitting the value of the readings of said counting unit to a distant station, said circuit means being variably conditioned for different readings of the first counting unit, a second counting unit, control means associated with said first counting unit for varying the condition of said circuit means in accordance with the readings of the first counting unit, and means controlled by the production of a predetermined condition in the circuit means for operating said second counting unit.

2. Measuring apparatus comprising, in combination, a first counting unit, a second counting unit, circuit means for electrically transmitting the readings of said counting units, control means associated with and controlled by said counting units for varying the condition of said circuit means in accordance with the readings of said counting units, and means controlled by the control means associated with said first counting unit for operating said second counting unit, said last mentioned means being responsive to a predetermined condition in the circuit means associated with said first counting unit.

3. In combination, a measuring unit at a station, means to operate said measuring unit cyclically, a plurality of electrical circuits, means associated with said measuring unit to control said circuits to transmit the readings of said measuring unit to a distant station by characteristic codes of current conditions individual to said readings, the code corresponding to the last measurement in a cycle and the code corresponding to the first measurement in the next cycle being different by current change in at least one of said circuits, a second measuring unit at said first station, means to operate said second measuring unit in response to the above mentioned change in code at the end of a cycle of said first measuring unit.

4. A register comprising in combination, a plurality of measuring wheels, driving means adapted to rotate one of said wheels, control means adapted, when operated to one position, to cause the rotation of said wheel by said driving means and when operated to a second position, to stop said rotation, a stepping magnet adapted, when the first mentioned wheel rotates through each revolution, to cause the next succeeding wheel to rotate through a predetermined arc, and restoring means adapted, when said control means is operated to its second position, to rotate said first mentioned wheel to the position it occupied prior to its rotation, the rotation of said wheel to said position being adapted to cause the stepping magnet to operate and release repeatedly and rotate said next succeeding wheel to its normal zero position.

JUDSON O'DONALD SHEPHERD.